3,427,134
FERROMAGNETIC COMPOUNDS AND METHOD OF PREPARATION

Frederic Holtzberg, Pound Ridge, and Siegfried J. Methfessel, Montrose, N.Y., assignors to International Business Machines Corporation, New York, N.Y., a corporation of New York
No Drawing. Filed Aug. 1, 1963, Ser. No. 299,180
U.S. Cl. 23—204         12 Claims
Int. Cl. C01f 17/00

This invention relates to new rare earth compounds and, more particularly, to those compounds having the formula:

$$A_4M_3$$

[where A is a rare earth selected from the group consisting of Gd, Tb, and Dy and M is a metalloid selected from the group consisting of Sb and Bi]
and their preparation. These new compounds either when pure or in solid solutions having the formulas:

$$(A_yA'_{1-y})_4M_3$$

[where A and A' are rare earths selected from the group consisting of Gd, Tb, and Dy and each is different; M is a metalloid selected from the group consisting of Sb and Bi; $1>y>0$];

$$A_4(Sb_xBi_{1-x})_3$$

[where A is a rare earth selected from the group consisting of Gd, Tb, and Dy; $1>x>0$]; and $$(A_yA'_{1-y})_4(Sb_xBi_{1-x})_3$$

[where A and A' are rare earths selected from the group consisting of Gb, Tb, and Dy and each is different, $1>x>0$ and $1>y>0$]
are ferromagnetic with higher Curie temperatures than those observed rare earth compounds with nonferromagnetic elements.

The rare earth metals and their compounds are important magnetic materials because they exhibit higher magnetic moments than the iron group metals (e.g., Fe, Co, and Ni) and their compounds.

The magnetic moment of the rare earth elements is either the sum or difference of the spin and orbital moments of the unpaired electrons in the 4f shell, the difference resulting for the lighter and the sum for the heavier elements. The outer bonding orbitals effectively shield the 4f shell so that chemical bond formation has little effect on the total magnetic moment. In contrast, the unpaired 3d electrons of the iron group metals are directly involved in bond formation and magnetic coupling so that compounds and alloys of these elements generally have different moments.

Heretofore, most investigations of rare earth systems with Group $V_a$ elements (e.g., N, P, As, Sb, and Bi) have been confined to the study of 1:1 compounds (Iandelli, A., "Rare Earth Research," MacMillan, New York, 1961, pages 135–151) or rare earth rich systems of the lighter rare earths (La and Ce) (Gschneidner, "Rare Earth Alloys," Van Nostrand, New York 1961, pages 111–115). Unlike the iron group metals, all of the rare earths and their compounds have Curie temperatures which are considerably below room temperature (i.e., 20° C.). Thus, in the interest of extending the temperature range of ferromagnetic properties, it is important to search for systems capable of raising the Curie temperature to above room temperature. Further, since it is not possible to saturate hexagonal hard magnetic elements such as Dy by commonly available magnetic field (i.e., 25,000 gauss) thereby taking advantage of their high moments, it is advantageous to place them in a cubic environment with triaxial anisotropy so that their magnetization can be saturated.

It is an object of the invention to prepare ferromagnetic compounds.

It is another object of the invention to prepare new rare earth compounds which are ferromagnetic.

It is a further object of the invention to prepare rare earth compounds having the formula $A_4M_3$ where A is a rare earth selected from the group consisting of Gd. Tb, and Dy and M is a metalloid selected from the group consisting of Bi and Sb.

It is still another object of the invention to prepare a rare earth solid solution system having the formula:

$$(A_yA'_{1-y})_4M_3$$

[where A and A' are rare earths selected from the group consisting of Gd, Tb, and Dy and each is different; M is a metalloid selected from the group consisting of Sb and Bi; $1>y>0$].

It is still another object of the invention to prepare a rare earth solid solution system having the formula:

$$A_4(Sb_xBi_{1-x})_3$$

[where A is a rare earth selected from the group consisting of Gd, Tb, and Dy; $1>x>0$].

It is still a further object of the invention to prepare a rare earth solid solution system having the formula:

$$(A_yA'_{1-y})_4(Sb_xBi_{1-x})_3$$

[where A and A' are rare earths selected from the group consisting of Gd, Tb, and Dy and A and A' are different; $1>x>0$ and $1>y>0$].

Still another object of the invention is to prepare rare earth solid solution systems having the above formulas which are ferromagnetic.

Another object of the invention is to prepare a ferromagnetic compound having the formula $Gd_4Bi_3$.

A further object of the invention is to prepare a ferromagnetic compound having the formula $Tb_4Bi_3$.

Further, another object of the invention is to prepare a ferromagnetic compound having the formula $Dy_4Bi_3$.

Still another object of the invention is to prepare a ferromagnetic compound having the formula $Gd_4Sb_3$.

A still further object of the invention is to prepare a ferromagnetic compound having the formula $Tb_4Sb_3$.

Still another object of the invention is to prepare a ferromagnetic compound having the formula $Dy_4Sb_3$.

The foregoing and other objects, features and advantages of the invention will become apparent from the more particular description of a preferred embodiment of the invention.

The rare earth compounds of the invention have the formula $A_4M_3$ where A is a rare earth selected from the group consisting of Gd, Tb, and Dy and M is a metalloid selected from the group consisting of Bi and Sb. These new rare earth compounds crystallize in an inverted $Th_3P_4$ structure in the space group $\overline{143}d$. The structure can be characterized as having a body centered cubic configuration with four formula units per unit cell. The inversion is a consequence of the metallic rare earth residing in the 16-fold sites and the Group V element Bi or Sb in the 12-fold sites in contrast to the metallic Th in the 12-fold sites and Group V element P in the 16-fold sites in the normal structure. The unusual bonding of the rare earth atoms in these structures affects their physical properties, for example, $Gd_4Bi_3$ has a Curie temperature of 340° K. (50° higher than the gadolinium metal (290° K.)) and is magnetically soft material (i.e., low coercive force ($H_c$), lower remanence ($B_r$) and low saturation field) as is the $Gd_4Sb_3$ compound. Thus, the gadolinium compounds and their solid solutions are suitable materials for use in transformer cores.

Dy$_4$Sb$_3$ obtained in the cubic configuration has triaxial anisotropy and can, therefore, be magnetically saturated giving rise to an energy product B$_r$H$_c$ greater than 45×10$^6$ gauss oersteds at liquid helium temperatures, in contrasts to the highest commercially available permanent magnetic material platinum-cobalt with $$H_cB_r = 26 \times 10^6$$

gauss oersteds. The hard magnetic materials are useful as permanent magnets in cryogenic systems and include Dy$_4$Sb$_3$, Dy$_4$Bi$_3$, Tb$_4$Sb$_3$, and Tb$_4$Bi$_3$ and solid solutions of the type Dy$_4$(Sb$_x$Bi$_{1-x}$)$_3$, Tb$_4$(Sb$_x$Bi$_{1-x}$)$_3$, and Tb$_y$Dy$_{1-y}$(Sb$_x$Bi$_{1-x}$)$_3$ [where 1>$x$>0 and 1>$y$>0].

Pure rare earth metal ingots (99.9 percent pure) selected from the group consisting of Gd, Tb, and Dy are filed into powders in a dry oxygen free atmosphere (e.g., He, Ar, N). Rare earth metal filings are then mixed with antimony or bismuth metal (99.9 percent pure) and pressed into pellets which are then placed in a crucible which is made of a material which does not enter into the reaction (e.g., tantalum or molybdenum). The size of the pellet is such that the pellet provides a piston fit to the crucible. A tapered plug of crucible material is forced into the crucible so that it presses on the surfaces of the pellets in order to exclude as much dead (i.e., empty) volume as possible. The tight fit and small particle size are necessary because if there is dead (or empty) space in the crucible the Sb or Bi vapor will condense out on cooling and result in inhomogeneous products. If the particles are too large, the high reaction temperature will vaporize the Sb or Bi before the reaction is completed and force the vapor out of the crucible. The excess tantalum above the plug is then peened over to form a tight closure so that Bi or Sb vapor pressure produced during the reaction can be contained within the crucible. The crucible is then placed on a pedestal in a quartz vacuum system centered in a radio frequency induction heating coil. An ambient atmosphere of helium is often used in place of the vacuum. Power is delivered to the coil at a rate such that the crucible temperature rises to 400°–500° C. within approximately 10–30 seconds. In this temperature range, a reaction is initiated which spontaneously raises the crucible temperature to about 2000° C. The initial heat input is therefore only used to start the reaction and the power can be turned off as soon as the crucible reaches white heat. Upon completion of the reaction, since there is no further heat delivered to the system from the exothermic heat of reaction or from the radio frequency coil, the sample cools rapidly to room temperature. When the tantalum crucible is opened, the compound appears as a dense metallic ingot.

The new rare earth compounds are brittle metallic materials which oxidize when exposed to air and are pyrophoric in finely powdered form.

For additional homogenization following the rapid rise in temperature in the above procedure, the crucible is held at a temperature below the melting temperature of the sample (1400°–1600° C.) for 20 minutes and then cooled rapidly.

Although the chemistry of the rare earths is relatively uniform, there are differences in the crystallization which can arise from the differences in radii and probably from differences in electronic configurations. Certain compounds herein described result as the primary crystallization from the melt and required no further heat treatment, others, however, crystallize as incongruent compounds and will always contain some second phase if cooled to room temperature without further heat treatment. The further heat treatment raises the temperature of the sample to the incongruent decomposition temperature in order to increase the diffusion rates to permit the compound to form under equilibrium conditions and yield a pure phase, viz, the 4:3 compound.

In certain cases, it is possible to obtain incongruently melting material with sufficient purity by the specific thermal treatment described in the examples.

Example I.—Gd$_4$Bi$_3$ 1.30 grams of Gd is filed into a fine powder in a dry box and the filings mixed with 1.29 grams of powdered bismuth metal. This mixture is then pressed into pellets in a nitrogen purged dry box. These pellets are then placed in an out-gassed tantalum crucible. The tapered tantalum plug is forced into the crucible so that it presses on the surface of the pellet in order to exclude as much dead volume as possible. The excess tantalum above the plug is then peened over to form a gas-tight closure. This crucible is now placed on a pedestal in a quartz vacuum system centered in a R.F. induction coil. The temperature of the crucible is raised to a temperature between 400°–500° C. in order to initiate the reaction. During the reaction, the temperature of the crucible is spontaneously raised by the exothermic heat of reaction to a temperature greater than 2000° C. which is above the melting point of the compound. The power input to the heating coil is turned off during the reaction. The cooling of the crucible after completion of the reaction is controlled by radiative heat losses in the vacuum. When the crucible is at room temperature, it is cut open and the resultant product Gd$_4$Bi$_3$ appears as a dense metallic ingot when it is removed.

Example II.—Gd$_4$Sb$_3$

The procedure of Example I is repeated except that 0.7548 gram of antimony are substituted for the bismuth. The resultant product is Gd$_4$Sb$_3$.

Example III.—Dy$_4$Sb$_3$ 1.3000 grams of Dy is filed into a fine powder in a dry box and the filings mixed with 0.7304 gram of powdered antimony. This mixture is then pressed into pellets in a nitrogen purged dry box. These pellets are then placed in an out-gassed tantalum crucible. The tapered tantalum plug is forced into the crucible so that it presses on the surface of the pellet in order to exclude as much dead volume as possible. The excess tantalum above the plug is then peened to form a gas-tight closure. This crucible is now placed on a pedestal in a quartz vacuum system centered in a R.F. induction coil. The temperature of the crucible is raised between 400°–500° C. to initiate the reaction whereby the temperature of the crucible is raised to about 2000° C. by the exothermic heat of reaction. The crucible is then allowed to cool to a temperature of approximately 1500° C. This temperature is maintained for 20 minutes and then the power to the radio frequency coil is turned off. Then the crucible is rapidly cooled to room temperature. The resultant product is Dy$_4$Sb$_3$.

Example IV.—Dy$_4$Bi$_3$

The procedure of Example III is followed except that 1.2538 grams of Bi are used in place of the antimony. The resultant product is Dy$_4$Bi$_3$.

Example V.—Tb$_4$Sb$_3$

The procedure of Example III is repeated except that 0.9526 gram of Tb is used in place of the Dy and 0.5463 gram of Sb are used in place of the amount of bismuth indicated in Example III. The resultant product is Tb$_4$Sb$_3$.

Example VI.—Tb$_4$Bi$_3$

The procedure of Example III is repeated except that 0.7551 gram of Tb is used in place of the Dy and 0.7448 gram of Bi are used in place of the amount of bismuth indicated in Example III. The result product is Tb$_4$Bi$_3$.

Solid solution systems of the rare earth compounds of the invention have the formulas:

$$(A_yA'_{1-y})_4M_3$$

[where A and A' are rare earths selected from the group consisting of Gd, Tb, and Dy and each is different; M is a metalloid selected from the group consisting of Sb and Bi; $1>x>0$];

$$A_4(Sb_xBi_{1-x})_3$$

[where A is a rare earth selected from the group consisting of Gd, Tb, and Dy; $1>x>0$]; and $$(A_yA'_{1-y})_4(Sb_xBi_{1-x})_3$$

[where A and A' are rare earths selected from the group consisting of Gd, Tb, and Dy and each is different; $1>x>0$ and $1>y>0$].

There rare earth solid solution systems are ferromagnetic and since their Curie temperatures are a rapidly varying function of composition they can be used to prepare a series of materials with Curie temperatures arbitrarily selected from a continuous range of Curie temperatures and thus find application in thermal control and safety devices. The solid solution systems are prepared in much the same manner as the rare earth compounds.

The initial mixture is prepared by weighting and thoroughly mixing the component materials (i.e., rare earths and metalloids) in finely divided form as specified for any of the Examples VII–XIX set forth in Tables I, II, and III. The mixture is then pressed into pellets and heated in a sealed tantalum crucible as in the procedure set forth for the pure compounds as prepared in Example I.

The solid solution systems prepared as shown in Examples VII–XIX have the formula set forth for each of the respective examples.

The procedure of Example I is followed except that the quantities indicated for each example in Tables I, II, and III are used, intimately mixed and then pressed into pellets. The resulting product is a solid solution system having the formula indicated for each example.

TABLE I

| Example No. $(A_yA_{1-y})M_3$ | Weight in grams | | | Solid solution system formula |
|---|---|---|---|---|
| | A | A' | M | |
| VII | Gd=.09968 | Tb=.90668 | Bi=.99360 | $Gd_{.4}Tb_{3.6}Bi_3$ |
| VIII | Gd=.19768 | Dy=.81712 | Bi=.98518 | $Gd_{.8}Dy_{3.2}Bi_3$ |
| IX | Tb=.29968 | Dy=.71502 | Bi=.98526 | $Tb_{1.2}Dy_{2.8}Bi_3$ |
| X | Gd=.50406 | Tb=.76414 | Sb=.73178 | $Gd_{1.6}Tb_{2.4}Sb_3$ |
| XI | Gd=.62602 | Dy=.64692 | Sb=.72762 | $Gd_{2.0}Dy_{2.0}Sb_3$ |
| XII | Tb=.75776 | Dy=.51654 | Sb=.72566 | $Tb_{2.4}Dy_{1.6}Sb_3$ |

The solid solutions $(A_yA'_{1-y})_4M_3$ show a linear variation of lattice constant with $y$ which can be used to determine the ratio of A to A'. The Curie temperature varies as a function of concentration of the rare earth atom. The magnetic moments of the solid solutions are an average of the individual rare earth moments weighted on the basis of their concentrations.

TABLE II

| Example No. $A_4(Sb_xBi_{1-x})_3$ | Weight in grams | | | Solid solution system formula |
|---|---|---|---|---|
| | A | Sb | Bi | |
| XIII | Gd=1.3000 | 0.1887 | 0.9718 | $Gd_4Sb_{0.75}Bi_{2.25}$ |
| XIV | Gd=1.3000 | 0.5661 | 0.3239 | $Gd_4Sb_{2.25}Bi_{0.75}$ |
| XV | Tb=1.3000 | 0.07469 | 1.15396 | $Tb_4Sb_{.3}Bi_{2.7}$ |
| XVI | Dy=1.3000 | 0.59345 | 0.50156 | $Dy_4Sb_{2.7}Bi_{.3}$ |

The solid solutions $A_4(Sb_xBi_{1-x})_3$ show a linear variation of lattice constant with $x$ which can be used to determine the ratio of Sb to Bi. The Curie temperature rises extremely rapidly with $x$ particularly in the case of $Gd_4(Sb_xBi_{1-x})_3$. Since the magnetic moment of the rare earth ions is not effected by chemical bonding, the magnetic moment per Gd atoms remains unchanged by this variation in the composition of the solid solution.

TABLE III

| Example No. $(A_yA'_{1-y})_4(Sb_xBi_{1-x})_3$ | Weight in grams | | | | Solid solution system formula |
|---|---|---|---|---|---|
| | A | A' | Sb | Bi | |
| XVII | Gd=0.14522 | Tb=1.07638 | .59740 | .18094 | $Gd_{.48}Tb_{3.52}Sb_{2.55}Bi_{.45}$ |
| XVIII | Gd=0.90274 | Dy=0.13326 | .08986 | .87410 | $Gd_{3.56}Dy_{.50}Sb_{.45}Bi_{2.55}$ |
| XIX | Tb=0.67342 | Dy=0.27542 | .38694 | .66418 | $Tb_{0.2}Dy_{3.80}Sb_{1.5}Bi_{1.5}$ |

The solid solutions $(A_yA'_{1-y})_4(Sb_xBi_{1-x})_3$ have the average physical properties of the above solid solutions, i.e., the average moment of the $(A_yA'_{1-y})_4$ part of the solid solution will vary rapidly as a function of the Sb and Bi concentration or conversely given a ratio of Sb to Bi the moment is the average of the moments of A and A' according to their concentrations.

The invention herein described results in new rare earth compounds having the formula $A_4M_3$ where A is a rare earth selected from the group consisting of Gd, Tb, and Dy and M is a metalloid selected from the Sb and Bi and their preparation. As has been shown, these compounds either in their pure state or in solid solution systems are ferromagnetic with high Curie temperatures.

While the invention has been particularly described with reference to preferred embodiments thereof, it will be understood by those skilled in the art that various changes in form and details may be made therein without departing from the spirit and scope of the invention.

What is claimed is:
1. A rare earth compound having a formula $A_4M_3$ wherein A is a rare earth selected from the group consisting of Gd, Tb, and Dy and M is a metalloid selected from the group consisting of Sb and Bi.
2. The rare earth compound $Gd_4Bi_3$.
3. The rare earth compound $Tb_4Bi_3$.
4. The rare earth compound $Dy_4Bi_3$.
5. The rare earth compound $Gd_4Sb_3$.
6. The rare earth compound $Tb_4Sb_3$.
7. The rare earth compound $Dy_4Sb_3$.
8. A rare earth solid solution system having a formula $(A_yA'_{1-y})_4M_3$ wherein A and A' are rare earths selected from the group consisting of Gd, Tb, and Dy and each is different; M is a metalloid selected from the group consisting of Sb and Bi; and $1>y>0$.
9. A rare earth solid solution system having a formula $A_4(Sb_xBi_{1-x})_3$ wherein A is a rare earth selected from the group consisting of Gd, Tb, and Dy and $1>x>0$.
10. A rare earth solid solution system having a formula $(A_yA'_{1-y})_4(Sb_xBi_{1-x})_3$ wherein A and A' are rare earths selected from the group consisting of Gd, Tb, and Dy and each is different; $1>y>0$ and $1>x>0$.
11. The rare earth solid solution system having the formula $Gd_4Sb_{0.75}Bi_{2.25}$.
12. The rare earth solid solution system having the formula $Gd_4Sb_{2.25}Bi_{0.75}$.

References Cited

UNITED STATES PATENTS 2,944,975  7/1960  Folberth _____ 23—204

FOREIGN PATENTS 649,839  10/1962  Canada.

OTHER REFERENCES

Mellor: Comprehensive Treatise on Inorganic and Physical Chemistry, vol. 5 (part 1), 1924, p. 604.

OSCAR R. VERTIZ, *Primary Examiner.*

H. S. MILLER, *Assistant Examiner.*

U.S. Cl. X.R.

252—62.55